Jan. 31, 1956  C. B. HOLDEN  2,732,914
PRODUCTION OF ISOPROPYL CHLOROFORMATE
Filed Feb. 25, 1953
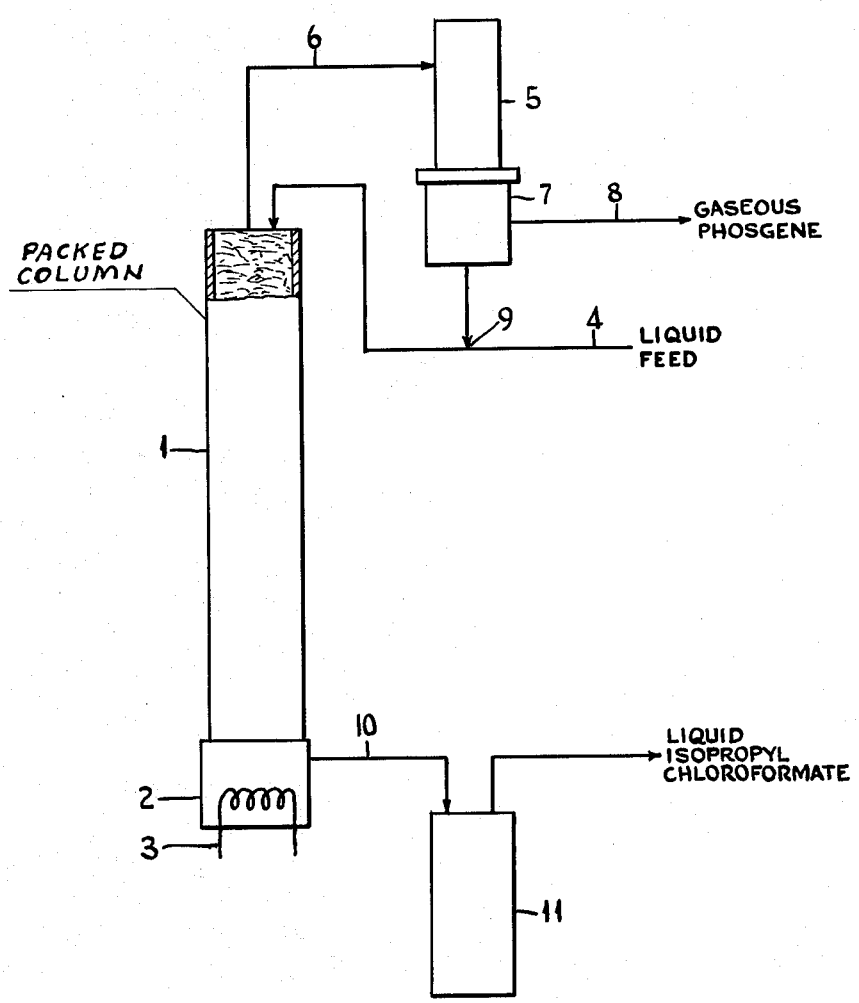
INVENTOR,
CALVIN B. HOLDEN
BY
Oscar L. Spencer
ATTORNEY

2,732,914
Patented Jan. 31, 1956

United States Patent Office

2,732,914

PRODUCTION OF ISOPROPYL CHLOROFORMATE

Calvin B. Holden, Doylestown, Ohio, assignor to Columbia-Southern Chemical Corporation, Allegheny County, Pa., a corporation of Delaware Application February 25, 1953, Serial No. 338,846

20 Claims. (Cl. 183—119)

This invention relates to a novel method of separating phosgene and isopropyl chloroformate from mixtures thereof.

Isopropyl chloroformate is frequently prepared by reaction of phosgene and isopropyl alcohol. In performing such reaction, mixtures of isopropyl chloroformate and phosgene are often encountered. At least one process depends for its success on the use of a reaction mixture of phosgene and isopropyl chloroformate. Such process is described in U. S. Patent No. 2,476,637 patented July 19, 1949, and granted to Franklin Strain and Wilbert F. Newton.

Practice of such processes is predicated at least to a considerable degree upon the recovery of unreacted phosgene. Thus, in a process such as described in U. S. Patent No. 2,476,637 wherein the phosgene concentration in the product-containing mixture is substantial, e. g. from 5 to 60 mole per cent, it is necessary to separate the phosgene from the chloroformate for the process to be practiced economically.

It is likewise often extremely important that the isopropyl chloroformate contain substantially no phosgene. For example, isopropyl chloroformate is reacted with meta-chloroaniline to prepare isopropyl N-3-chlorophenyl carbamate. The presence of phosgene in admixture with the isopropyl chloroformate reactant results in the formation of a by-product which detracts from the value of the carbamate. In particular, the presence of phosgene provides di (chlorophenyl) ureas in the ultimate reaction product. This compound has different solubility characteristics than isopropyl N-3-chlorophenyl carbamate, and when attempts are made to provide liquid formulations of the carbamate, a sizable solid phase is present due to the insolubility of the urea compound. Liquid formulations of isopropyl N-3-chlorophenyl carbamate, an extremely effective herbicide, are most conveniently applied by spraying. However, the insoluble phase in the liquid formulation due to the phosgene-chloroaniline by-product causes clogging of the spray nozzle and otherwise hampers the ease with which the material may be sprayed.

In accordance with the instant invention, a novel process has been provided whereby phosgene and isopropyl chloroformate may be separated from mixtures thereof in a simple manner without undue loss of either component. Moreover, this invention makes it possible to separate isopropyl chloroformate from such mixtures without encountering undesirable decomposition of the isopropyl chloroformate.

According to the present invention, a mixture of phosgene and isopropyl chloroformate is introduced into the upper portion of a treating zone while a liquid pool of isopropyl chloroformate is established and maintained at the lower portion of the zone. This pool is maintained at approximately its boiling point and sufficient heat is supplied thereto to vaporize and return a portion of the isopropyl chloroformate in the pool to the treating zone whereby gaseous isopropyl chloroformate is apparently in contact with the liquid mixture of phosgene and isopropyl chloroformate.

A portion of the pool is normally withdrawn continuously and cooled to room temperatures, e. g. 25° to 35° C. The gaseous stream rising to the top of the treating zone is removed from the zone continuously. Although not essential to the production of pure isopropyl chloroformate, this gaseous mixture is generally treated to recover pure or essentially pure gaseous phosgene. Typically, this involves cooling the gaseous mixture to a temperature above about 10° C. at atmospheric pressure. This permits a selective condensation of isopropyl chloroformate to occur, with at least a portion of the phosgene remaining in the gaseous state. As will become more apparent in the ensuing description of the invention, the temperature of this selective condensation may be varied depending on the specific objective of the operation.

If this invention is to be performed in a manner such as to produce substantially pure isopropyl chloroformate, it is essential that the isopropyl chloroformate be withdrawn from the system (treating zone and pool) and cooled within 15 minutes after it has been introduced into the system as part of a liquid mixture of phosgene and isopropyl chloroformate feed. This time limit for the presence of isopropyl chloroformate in the system is critical and, if the isopropyl chloroformate is not removed within such period, significant losses of product are encountered.

Thus, a critical step of this invention involves performing the aforedescribed process such that the isopropyl chloroformate is not treated (under the conditions within the treating zone or pool) for a period in excess of 15 minutes. Unless, this time limit is strictly adhered to, serious decreases in the yield of isopropyl chloroformate that is recovered, either as purified material or in the gas stream emanating from the upper portion of the treating zone, is observed. Moreover, a suitably pure product is not attained.

This invention provides advantages which are not possessed by other techniques recommended for separating these two materials. For example, this invention is superior to "air-degassing," e. g. a process wherein the phosgene is removed by bubbling dry air through a liquid mixture of the two materials. Air-degassing has been observed to result in the loss of a considerable portion of the materials, phosgene and isopropyl chloroformate, which are entrained in the air and which are not susceptible to recovery. Sizable losses such as those encountered in air-degassing are not observed in the practice of this invention.

In performance of this invention, a column packed with suitable discs or rings made of refractory materials to provide a greater surface area within the column and improved contact between the liquid and gaseous phases therein is suitably employed. A mixture of isopropyl chloroformate and phosgene is introduced into the column at the upper extremity of the packed zone. At the lower portion of the packed zone, a still containing a pool of isopropyl chloroformate is provided. This pool is maintained at its boiling point with sufficient heat being added to vaporize a portion of the pool. These vapors are permitted to rise into the packed portion of the column to provide a rising stream of gaseous isopropyl chloroformate in contact with the descending stream of liquids, phosgene and isopropyl chloroformate.

The pool of liquid isopropyl chloroformate need not necessarily be situated at the lower extremity of the column but may be situated as desired. It is necessary, however, that the liquid in the lowermost portion of the column be added to the pool and that the vapors formed by heating the pool be introduced into the bottom of the column. By appropriate material-moving equipment, such as pumps, this may be achieved permitting the pool to be situated in places other than at the bottom of the column.

The gaseous mixture of phosgene and isopropyl chloroformate emanating from the top of the column is treated to at least provide a partial removal of the phosgene. Notably, these gases are cooled at a point remote from their exit from the column, such as by passing them through a condenser or other such heat-exchange equipment. The temperature of the gaseous stream leaving the column is reduced as low as 10° C. thereby providing a condensate which contains all the isopropyl chloroformate. By separating the resulting gaseous and liquid phases, essentially pure phosgene may be removed as a gas while the liquid phase may constitute recycle or reflux to the column.

The precise temperature to which the gaseous mixture is cooled in the selective condensation will vary depending on the particular result desired. As long as the condensation temperature is between about 10° C. and 98° C. at atmospheric pressure, it is possible to provide a selective separation of the two materials. That is, within such temperature range, the condensate will contain a smaller percentage of phosgene than the mixture prior to the cooling. Conversely, the gaseous phase will be richer in phosgene than the mixture emanating from the column.

Generally, if the temperature is within the lower portion of this range, e. g., between 10° C. and about 30° C., the gas phase may be expected to contain essentially pure phosgene. Therefore, if pure phosgene is a desirable result, it is advisable to conduct the cooling such that temperatures between 10° C. and about 30° C. are achieved. It will be appreciated, however, that considerable latitude within this temperature range is suitable as far as practice of this invention is concerned. If desired, the temperature may be selected so as to provide a liquid phase which has the same composition as the feed, in which instance it may merely be combined with the feed as direct recycle. Similarly, it is possible to employ a temperature which provides a liquid phase richer than the feed with respect to isopropyl chloroformate in order to provide a reflux for the column.

The column, as it functions, may be considered to provide a descending liquid stream which is progressively becoming richer in isopropyl chloroformate. In a convenient apparatus, a still pot or other collecting vessel is disposed such that the liquid isopropyl chloroformate collects therein to form a pool at the lower extremity of the column. A gas stream flowing countercurrent to the liquid stream may be considered to be present, with such stream becoming enriched with phosgene as it rises.

The rising gas stream is provided by vaporizing a portion, but not all, of the isopropyl chloroformate collected in the pool. Maintaining suitable heat transfer means in or around the collecting vessel for the pool is suitable expedient for satisfying the heat requirements of the operation.

In the preferred mode of operation, the pool of isopropyl chloroformate which collects at the bottom of the column is maintained at a temperature of about 95° C. Unless such temperature is maintained, some phosgene may be found in the pool and essentially pure isopropyl chloroformate is not obtained. Of course, this temperature will vary if superatmospheric or subatmospheric pressures are employed. In any case, the absence of detrimental quantities of phosgene in the isopropyl chloroformate product is attained by maintaining the pool of isopropyl chloroformate at the boiling point of essentially pure isopropyl chloroformate at the pressure under which the pool is operated.

Essential to the practice of this invention is the rapid removal and cooling of the isopropyl chloroformate from the treating zone and pool. It has been found that, based on the average movement of the material masses involved, the isopropyl chloroformate must not be present in the treating zone and still in excess of 15 minutes. Suitably, the isopropyl chloroformate should be cooled to at least about 40° C., and notably about 25° C., within 15 minutes of the time it is fed to the system.

Moreover, it has been found that the isopropyl chloroformate should not remain in the pool at the lower extremity of the column in excess of 10 minutes. Preferably, a hold-up time in the pool of 6 minutes or less is most suitable, a period of about 4 minutes being recommended. In general, the hold-up period in the pool appears more detrimental than the time the isopropyl chloroformate is in the packed zone of the column.

It is emphasized that generally operation of this process establishes a ratio of 2 to 1 with respect to the hold-up time in the pool as compared with the delay in the packed section. With the maximum hold-up that is tolerable in the pool being 10 minutes, an overall delay of 15 minutes is maximum under such circumstances. It may be possible to operate at a different ratio of hold-up times in the respective portions of the system and it then is possible to permit a somewhat lengthier delay in the column, e. g. 10 minutes or slightly higher so long as the 10-minute limitation in the pool is respected. Thus, if the delay in the pool is established at 5 minutes, for example, a delay of 20 minutes in the packed tower is possible. The overall 15-minute limitation, therefore, refers to the normal operational procedure as it was observed. The 10-minute maximum hold-up in the pool is an absolute maximum regardless of the length of the delay in the rest of the system. Thus, for practical purposes, a process wherein the hold-up time in the pool is no greater than 10 minutes is suitable for practice of this invention. On the other hand, depending somewhat on the shortening of the delay in the pool, longer hold-up times in the column are possible.

In performance of the invention, the isopropyl chloroformate is continuously withdrawn from the pool, e. g. via a weir, and immediately thereafter cooled. By establishing the rate of feed, amount of heat added to the system via the vaporization of a portion of the pool, cross-sectional area of the treating zone, size of the individual unit comprising the packing material, etc., the appropriate hold-up times may be achieved by recourse to well-known engineering principles. A frequently employed feed is the mixture obtained when isopropyl chloroformate is prepared in accordance with the process described in U. S. Patent No. 2,476,637. Accordingly, this invention is particularly suitable for operation in conjunction with such process for recovering the unreacted phosgene whereby it may be recycled to the reaction zone, and pure isopropyl chloroformate may be continuously separated without interrupting its production.

One reaction mixture which exemplifies the feeds that are employed comprises about 40 mole per cent phosgene, with the balance isopropyl chloroformate. As explained in the afore-designated patent, the temperature of the reaction mixture varies depending on the mole per cent of phosgene present. With this mixture, the temperature is about 32° C. and the reaction mixture may be fed directly to the scrubbing zone.

In some instances, the condensate obtained when the vapors that rise out of the column are condensed is combined with the reaction mixture of the alcohol-phosgene reaction to comprise the feed. This is most frequently done when the condensate contains appreciable quantities of isopropyl chloroformate. Alternatively, the condensate may be returned directly to the column as reflux.

The following example illustrates a manner in which the present invention may be practiced, but is not intended to be construed as restricting the practice of the invention to the details recited:

*Example I*

The invention may be more readily illustrated by reference to the accompanying drawing. Tower 1 is packed with ½ inch ceramic Berl saddles. This tower comprised two sections, each five feet high with an inner diameter of 12 inches. At the bottom of the packed column, still pot 2 was disposed. Tubes were disposed within the still whereby steam was circulated therethrough to provide the heat requirements of the system.

This system was operated by feeding a mixture of phosgene and isopropyl chloroformate to the top of column 1 via line 4. The vapors rising from column 1 were led through water-cooled condenser 5 via take-off line wherein the isopropyl chloroformate was selectively condensed. Separation of the resulting liquid and gas phase was performed in separator 7 and gaseous phosgene was removed in pipe 8. The condensate was added to the feed at and returned to the column.

Isopropyl chloroformate was collected in still 2 and revaporized therein by steam-heated coils 3. The purified isopropyl chloroformate was removed from still 2 by a liquid level take-off pipe 10 and was immediately cooled in heat exchanger 11.

Phosgene which was separated in phase separator 7 was recycled to the reaction zone (not shown) wherein the isopropyl chloroformate was prepared. Isopropyl chloroformate, after being cooled in heat exchanger 11 was stored for future use.

The following data taken while the apparatus was in continuous operation summarizes the operation of the above-described apparatus without any attempts being made to obtain particular pressures in the system:

| Runs Nos. | I | II | III |
|---|---|---|---|
| Feed (pounds per hour): | | | |
|   Isopropyl Chloroformate | 205.5 | 239.0 | 248.4 |
|   Phosgene | 112.8 | 131.2 | 136.6 |
| Reflux at 9 (pounds per hour): | | | |
|   Isopropyl Chloroformate | 27.8 | 47.5 | 125.5 |
|   Phosgene | 29.7 | 70.1 | 104.5 |
| Product (pounds per hour): | | | |
|   Phosgene | 112.8 | 131.2 | 136.6 |
|   Isopropyl Chloroformate | 189.0 | 224.7 | 242.0 |
| Purity of Isopropyl Chloroformate (percent) | 97.9 | 98.0 | 98.8 |
| Recovery of Isopropyl Chloroformate (percent) | 90.0 | 92.2 | 94.1 |
| Temperatures, ° C.: | | | |
|   Still | 99 | 98 | 95 |
|   Feed at 4 | 32.5 | 32.2 | 32.4 |
|   Condensate at 9 | 24.5 | 29.0 | 22.0 |
|   Phosgene at 8 | 25.2 | 27.1 | 23.9 |
|   Feed at 9 | 31.5 | 31.6 | 28.5 |

In all of the above runs, the average time isopropyl chloroformate remained in the system prior to being cooled in heat exchanger 11 was approximately 5½ minutes. Of this time, the delay was 4 minutes in the pool in still 2.

Another series of runs were performed in the manner described above. The following table presents the data and other pertinent facts: All figures for materials are in pounds per hour.

| Runs Nos. | 1 | 2 | 3 | 4 |
|---|---|---|---|---|
| Feed: | | | | |
|   Isopropyl Chloroformate | 232.0 | 259.0 | 256.0 | 232.5 |
|   Phosgene | 123.8 | 142.3 | 140.5 | 127.6 |
| Reflux: | | | | |
|   Isopropyl Chloroformate | 8.55 | 1.01 | 1.01 | 1.01 |
|   Phosgene | 7.95 | 0.94 | 0.94 | 0.94 |
| Purity of Product (percent) | 96.5 | 96.9 | 97.9 | 97.8 |
| Recovery of Isopropyl Chloroformate (percent) | 98.9 | 97.4 | 91.2 | 100 |
| Temperatures, ° C.: | | | | |
|   Still | 96.5 | 97 | 99.5 | 101 |
|   Feed at 4 | 32.2 | 32.2 | 32.0 | 32.6 |
|   Phosgene at 8 | 17.2 | 13.1 | 14.4 | 15.9 |
| Duration of Run (hours) | 7 | 7 | 5 | 5 |

In the above runs, the total holdup of isopropyl chloroformate in the system from the time it was fed until it was cooled was slightly above six minutes, with the isopropyl chloroformate being in the still about 4 of these minutes.

Although the instant invention has been described with reference to specific details of certain embodiments, it is not intended that such details shall be construed as limitations upon the scope of this invention, except insofar as set forth in the appended claims.

I claim:

1. A method of treating mixtures of phosgene and isopropyl chloroformate which comprises introducing a mixture of phosgene and isopropyl chloroformate into the upper portion of a defined zone, providing a pool of isopropyl chloroformate, maintaining the pool by adding thereto the liquid present in the lowermost portion of the zone, vaporizing a portion of the contents of said pool and passing the resulting vapors into the lower portion of the zone, removing a portion of the liquid contents of the pool and cooling the removed liquid to at least 40° C., said removal and cooling being performed within 15 minutes of the time such material was introduced into the zone and removing gaseous phosgene from said zone.

2. A method of treating mixtures of phosgene and isopropyl chloroformate which comprises feeding a liquid mixture of phosgene and isopropyl chloroformate into the upper portion of a vertically disposed zone, providing a liquid pool of isopropyl chloroformate, adding the liquid present in the lowermost portion of the zone to the pool, heating the pool to vaporize a portion of its liquid contents, passing the resulting vapors into the lower portion of said zone, withdrawing a portion of the liquid contents of the pool and cooling the removed liquid to a temperature at which substantial decomposition of isopropyl chloroformate is avoided, said cooling being performed within 15 minutes of the time the liquid was introduced into the upper portion of the zone and removing gaseous phosgene from said zone.

3. The method of claim 2 wherein isopropyl chloroformate is in admixture with the said phosgene removed from the uppermost section of the zone.

4. The method of claim 3 wherein said removed mixture is cooled to a temperature below 98° C. and above 10° C.

5. A method of treating mixtures of phosgene and isopropyl chloroformate which comprises feeding a liquid mixture of phosgene and isopropyl chloroformate into the upper portion of a vertically disposed packed zone, providing a liquid pool of isopropyl chloroformate at the lowermost portion of the zone, vaporizing a portion of the pool whereby vapors of isopropyl chloroformate rise upwardly into the zone, withdrawing a portion of the liquid contents of the pool and cooling the removed liquid effecting said withdrawal and cooling at such a rate and to such a temperature that substantial decomposition of the isopropyl chloroformate is avoided, and removing gaseous phosgene from the zone.

6. The method of claim 5 wherein the withdrawn liquid is cooled to at least 40° C. within 15 minutes of the time it was introduced into the upper portion of the zone as a part of a liquid mixture of phosgene and isopropyl chloroformate.

7. The method of claim 5 wherein the phosgene vapors present in the uppermost portion of the zone are withdrawn from the zone.

8. The method of claim 7 wherein the withdrawn vapors are cooled to at least 98° C.

9. The method of claim 7 wherein the withdrawn vapors are cooled to between 98° C. and 10° C., and the remaining gaseous phase is recovered.

10. The method of claim 7 wherein the withdrawn vapors are cooled to between 98° C. and 10° C., and the condensate is returned to the uppermost portion of the zone.

11. A method of treating mixtures of phosgene and isopropyl chloroformate which comprises introducing a mixture of phosgene and isopropyl chloroformate into the upper portion of a defined zone, providing a pool of isopropyl chloroformate, maintaining the pool by adding thereto the liquid present in the lowermost portion of the zone, vaporizing a portion of the contents of said pool and passing the resulting vapors into the lower portion of the zone, removing a portion of the liquid contents of the pool and cooling the removed liquid to at least 40° C., said cooling being performed within 10 minutes of the time such material was added to the liquid pool and removing gaseous phosgene from said zone.

12. A method of treating mixtures of phosgene and isopropyl chloroformate which comprises providing a vertically disposed packed zone, establishing a downwardly-flowing stream of a liquid mixture of isopropyl chloroformate and phosgene in the zone which becomes progressively richer in isopropyl chloroformate as it descends through the zone, maintaining a pool of liquid isopropyl chloroformate at the lowermost portion of said zone, said descending liquid stream adding to the pool, vaporizing a portion of the liquid contents of the pool to provide a gaseous stream which rises through the packed zone and becomes progressively richer in phosgene, removing gaseous phosgene from the zone, removing a portion of the liquid contents of the pool, and cooling the removed liquid to a temperature at which substantial decomposition of isopropyl chloroformate is avoided, said cooling being performed within 15 minutes of the time the liquid is introduced into the zone.

13. The method of claim 12 wherein the removed liquid material is cooled to at least 40° C.

14. The method of claim 12 wherein the removed liquid is cooled within 10 minutes of the time it first becomes part of the pool.

15. The method of claim 12 wherein the rising gaseous stream is removed from the uppermost section of the zone.

16. The method of claim 15 wherein the removed gaseous stream is cooled to a temperature between 98° C. and 10° C., and the resulting condensate is returned to the packed zone.

17. A continuous method of treating a mixture of phosgene and isopropyl chloroformate which comprises continuously introducing a mixture of phosgene and isopropyl chloroformate into an upper portion of a liquid-gas contact tower, establishing a pool of isopropyl chloroformate in liquid-gas communication with a lower portion of the tower, continuously vaporizing a portion of the contents of the pool and passing the resulting vapors into the tower whereby to establish a zone of contact between a descending liquid and rising gas stream, the rising gas stream becoming progressively richer in phosgene and the descending liquid stream becoming progressively richer in isopropyl chloroformate, adding the chloroformate-enriched liquid stream to the pool, continuously removing gaseous phosgene from an upper portion of the liquid-gas contact tower and continuously withdrawing a portion of the liquid pool at such a rate and cooling the withdrawn portion to such a temperature that substantial decomposition of isopropyl chloroformate is avoided.

18. The method of claim 17 wherein the withdrawn portion of the pool is cooled to at least 40° C.

19. The method of claim 17 wherein the phosgene-enriched stream removed from said tower is cooled to condense a portion thereof and introducing the condensate to an upper portion of the tower.

20. The method of claim 17 wherein the phosgene-enriched stream removed from said tower is cooled to between 98° C. and 10° C. and introducing the resulting condensate to the tower.

References Cited in the file of this patent

UNITED STATES PATENTS

| | | |
|---|---|---|
| 2,397,630 | Strain | Apr. 2, 1946 |
| 2,476,637 | Strain | July 19, 1949 |
| 2,487,576 | Meyers | Nov. 8, 1949 |
| 2,500,291 | Liebel et al. | Mar. 14, 1950 |
| 2,574,644 | Landau | Nov. 13, 1951 |
| 2,638,405 | Frazier | May 12, 1953 |